(12) United States Patent
Martinez

(10) Patent No.: US 6,515,639 B1
(45) Date of Patent: Feb. 4, 2003

(54) CATHODE RAY TUBE WITH ADDRESSABLE NANOTUBES

(75) Inventor: Luis Martinez, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/455,953

(22) Filed: Dec. 7, 1999

(51) Int. Cl.[7] .................................................. H01J 29/00
(52) U.S. Cl. ................. 345/11; 345/7; 345/8; 345/22; 313/466; 313/470; 313/474; 313/496
(58) Field of Search .................................. 313/466, 470, 313/474, 496; 345/7, 8, 11, 22

(56) References Cited

U.S. PATENT DOCUMENTS

| | | | |
|---|---|---|---|
| 5,508,590 A | | 4/1996 | Sampayan et al. ........ 315/169.1 |
| 5,697,827 A | * | 12/1997 | Rabinowitz ................... 445/60 |
| 5,753,088 A | * | 5/1998 | Olk ............................. 204/173 |
| 5,764,004 A | | 6/1998 | Rabinowitz ............... 315/169.1 |
| 5,773,834 A | | 6/1998 | Yamamoto et al. ...... 250/423 F |
| 5,889,363 A | * | 3/1999 | Beeteson et al. ............ 313/495 |
| 5,889,372 A | * | 3/1999 | Beeteson et al. ......... 315/169.1 |
| 5,967,873 A | * | 10/1999 | Rabinowitz ................... 445/50 |
| 6,008,573 A | * | 12/1999 | Beeteson et al. ............ 313/422 |
| 6,181,055 B1 | * | 1/2001 | Patterson et al. ............ 313/310 |
| 6,221,489 B1 | * | 4/2001 | Morita et al. ............. 423/447.1 |
| 6,239,547 B1 | * | 5/2001 | Uemura et al. ............. 313/495 |
| 6,250,984 B1 | * | 6/2001 | Jin et al. ....................... 445/51 |
| 6,359,378 B1 | * | 3/2002 | Patterson et al. ........... 313/309 |
| 6,359,383 B1 | * | 3/2002 | Chuang et al. ............. 313/309 |

FOREIGN PATENT DOCUMENTS

JP    02001068016    *    3/2001    ............ H01J/1/304

\* cited by examiner

*Primary Examiner*—Bipin Shalwala
*Assistant Examiner*—Vincent E. Kovalick
(74) *Attorney, Agent, or Firm*—Mayer Fortkort & Williams, PC

(57) ABSTRACT

A cathode ray tube (CRT) display includes a display panel having a matrix of addressable carbon nanotubes, in which each individual nanotube can be selected to help draw a corresponding electron beam from a red, green, or blue electron gun to the desired portion of the display panel, thereby creating the desired image on through the display panel.

13 Claims, 3 Drawing Sheets

CATHODE RAY TUBE WITH ADDRESSABLE NANOTUBES

BACKGROUND

1. Field of the Invention

This invention relates to display systems, and in particular, to cathode ray tube (CRT) display systems.

2. Description of Related Art

Conventionally, cathode ray tubes (CRTs) have been used to produce high quality video displays. CRT screens are projection devices typically comprising an electron gun assembly directed at a phosphor-coated screen and circuitry to control the path of the emitted electrons. In a typical color CRT display, the electron gun assembly has three electron guns, with each gun assigned to a different one of the three primary colors, red (R), green (G), and blue (B). Electrons from the cathodes are accelerated in a vacuum from the cathodes to the screen. At the screen, the electrons excite the phosphors to generate a light output.

In a typical CRT, the cathode at one end of the CRT emits a beam of electrons towards the anode through a grid. After passing through the anode, the electron beam is focused and deflected toward a desired area of the screen. The screen has a pattern of RGB phosphor stripes, which emit light when struck with electrons to produce the desired color output. The electron beam is typically scanned raster style across portions of the screen to create the desired visual image. The electrons travel from the photocathode to the phosphor through a vacuum, which is formed by separating the cathode from the screen by some distance and sealing the vacuum, such as by frit sealing.

One way of altering the motion of electrons to a desired location on the screen is by passing the electron beam through a magnetic field. The magnetic fields can be generated by passing current through relatively high inductance yoke coils, usually placed around the outside of the neck of the CRT. Although this method can be made to operate from low voltage power supplies, the current levels required by the yoke coils increase the amount of power required by the CRT display system. The inductance of the yoke coils also places an upper limit on the frequencies which can be used to drive them. Consequently, even though the electromagnetically deflected tube offers the advantages of good focus and can be driven by low voltage deflection circuitry, it also increases the weight and power requirements of the system.

In addition, CRT screens are limited in size due to the requirement that the electrons must travel in a vacuum. Much of the weight and bulk of a CRT is due to the heavy walls containing the vacuum. As the size of the screen increases, the walls necessarily become heavier and thicker. There comes a point where it is not economically or mechanically feasible to make a large CRT screen. Typically, 50-inch diagonal screens are the largest CRT displays commercially practicable.

Accordingly, a display system is desired that overcomes the deficiencies described above of conventional display systems.

SUMMARY

In accordance with the invention, a cathode ray tube (CRT) display system is provided utilizing a matrix of addressable carbon nanotubes covered by a pattern of phosphor. The nanotubes can be addressed or selected individually, corresponding to the picture being reproduced on the CRT. Rear projection type electron guns, in conjunction with the addressable nanotube matrix, eliminates the need for a deflection yoke, thereby reducing both the size and weight of the CRT display.

According to one embodiment, red (R), green (G), blue (B) rear projection electron guns direct scanning electron beams, within a vacuum enclosure, to the nanotube matrix. The electron beams have varying intensity according to the picture to be reproduced. In conjunction with the electron beam scanning, nanotubes on the matrix are selected, also according to the picture to be reproduced. Selected nanotubes turn on and, acting as an accelerating electrode, help draw the desired electron beams from the RGB electron guns to the desired portions of the nanotube matrix. Upon striking the phosphor overlying the selected nanotube, the phosphor emits the desired light, resulting in a re-created visual image. The addition of the addressable nanotube matrix eliminates the need for a large magnetic deflection yoke. Thus, the CRT display according to the present invention is smaller and lighter than conventional CRT displays and requires less energy consumption.

The present invention will be more fully understood upon consideration of the detailed-description below, taken together with the accompanying drawings.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with the present invention, a cathode ray tube (CRT) display screen utilizes addressable carbon nanotubes covered by phosphor patterns to decrease the power consumption and weight of the display system.

Figure 1:
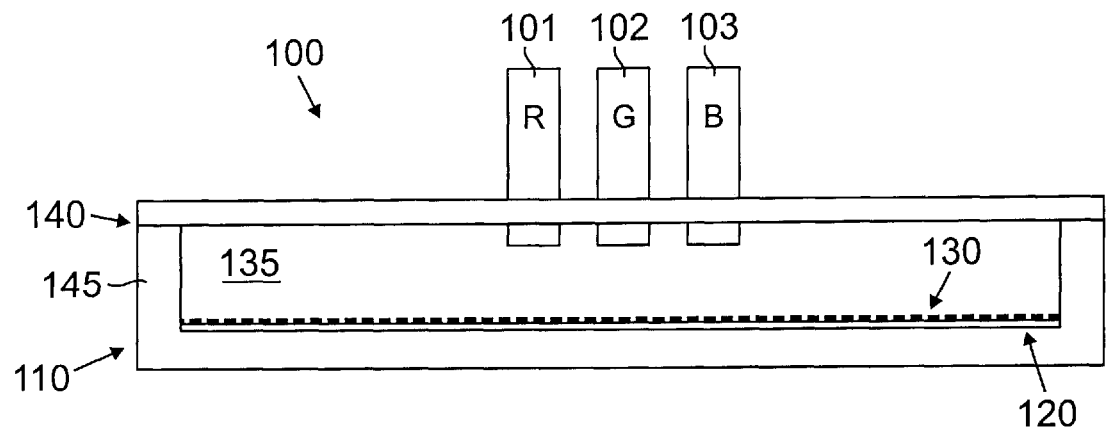
FIG. 1 is a diagram of a CRT display according to one embodiment of the present invention.

FIG. 1 shows one embodiment of the present invention, in which a CRT display 100 has an electron gun assembly comprised of three electron guns 101, 102, and 103, each assigned to a primary color, red (R), green (G), and blue (B), respectively. Electron guns 101–103 direct electron beams toward a CRT display panel 110 formed from an addressable carbon nanotube matrix 120 and RGB phosphor patterns 130 overlying nanotube matrix 120. CRT display panel 110 and the output of electron guns 101–103 are enclosed in a vacuum 135, e.g., by using frit seals 140 to maintain a vacuum in an enclosure 145. The front screen of enclosure 145 is clear, e.g., glass, so that desired images resulting from light emitted from RGB phosphor patterns 130 can be viewed.

Figure 2:
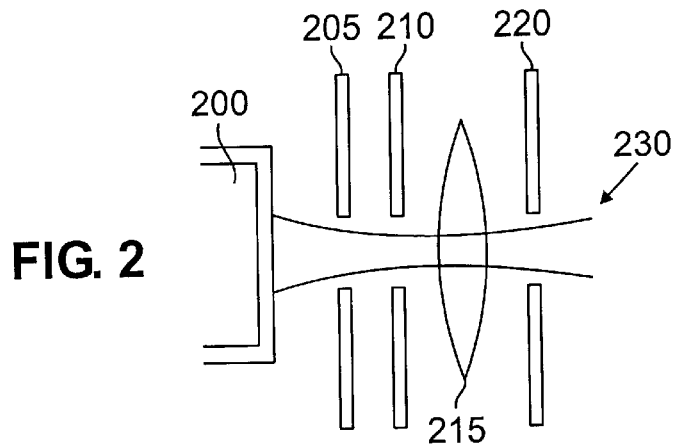
FIG. 2 is a diagram of a modified electron gun for use in the CRT display of FIG. 1.

FIG. 2 shows one of electron guns 101–103 of FIG. 1. An electron gun typically includes an electron emitting cathode 200, grids 205 and 210, a pre-focusing element 215, and an anode 220. As is known in the art, voltages applied to grids 205 and 210 direct an electron beam 230 generated from cathode 200 to a desired location on nanotube matrix 120. Individual phosphor patterns on nanotube matrix 120 emit color (red, green, or blue) at the corresponding wavelength when impinged on by the electron beam.

In a typical color CRT, three electron guns 101–103 are employed side by side and each generates its own electron beam which strikes phosphor stripes of only a given color on CRT display panel 110. Thus, the electron beam generated by "red" electron gun 101 only impinges on red phosphor stripes over nanotube matrix 120. The color selection for the display is accomplished by selectively energizing "red" electron gun 101, "green" electron gun 102, or "blue" electron gun 103. The electron beam from the electron guns scans nanotube matrix 120 in a raster fashion, with varying intensity, so that the faceplate or screen is scanned while the intensity of the beam is varied in accordance with input signal information. As the beam from electron guns 101–103 is swept, the electron beam current is modulated by the picture (video) information which causes the phosphor at different areas on CRT display panel 110 to emit light at contrasting brightness levels, thus, producing the desired image on the face of the tube.

Figure 3:
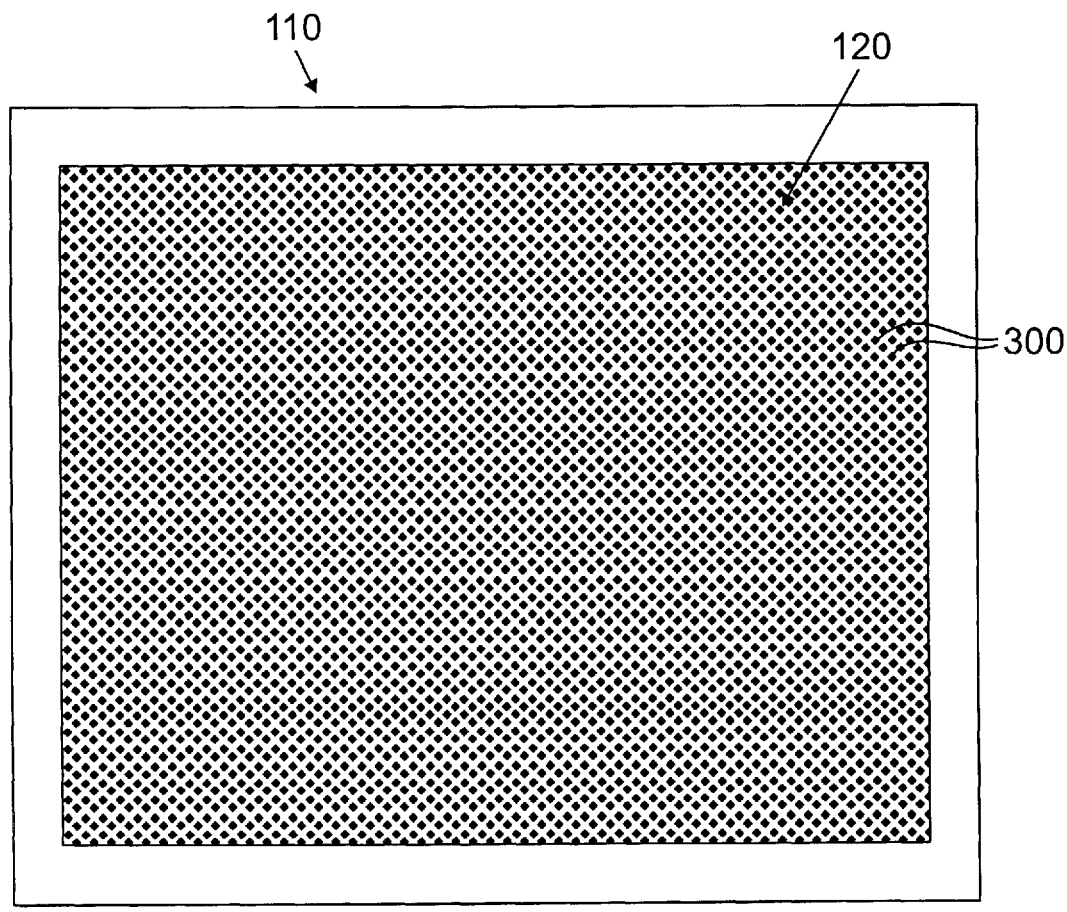
FIG. 3 is a front view of a display panel for use in the CRT display of FIG. 1.
Figure 4A:
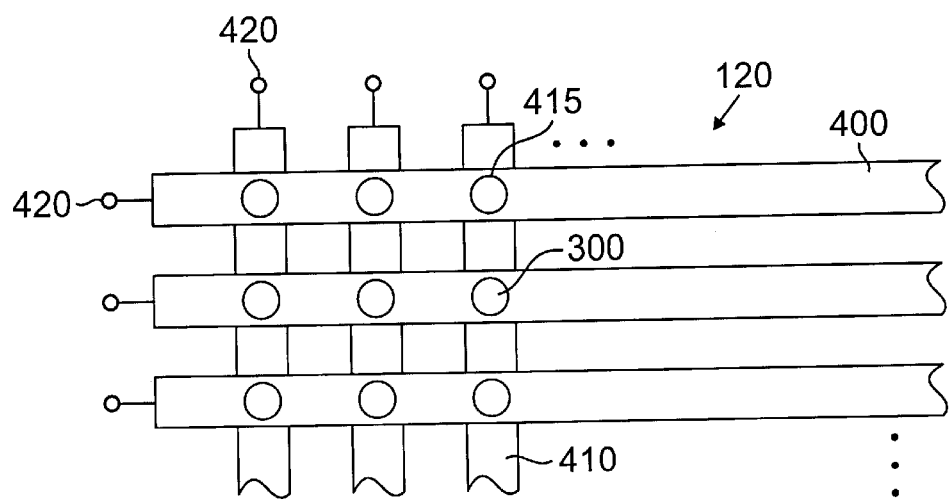
FIG. 4A is a front view of a portion of a nanotube matrix of the display panel of FIG. 3.
Figure 4B:
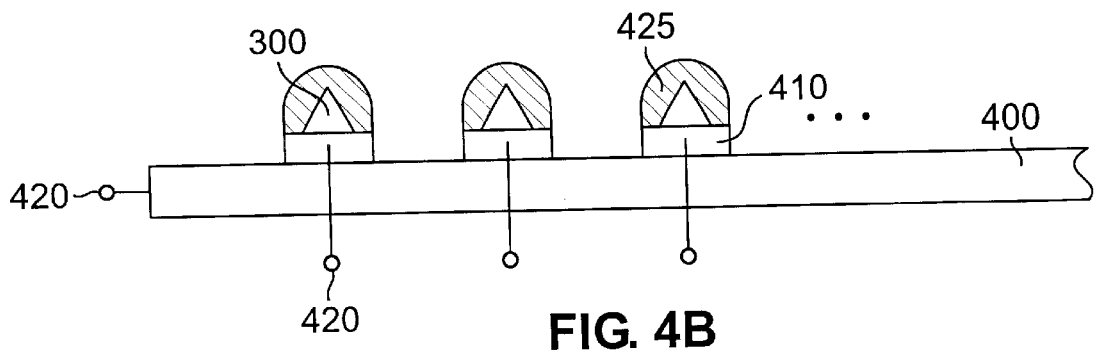
FIG. 4B is a top view of the nanotube matrix of FIG. 4A.

FIG. 3 shows a front view of CRT display panel 110 with nanotube matrix 120 composed of a matrix of carbon nanotubes 300. It should be noted that individual nanotubes 300 are shown enlarged for clarity. Typically, for a 20-inch diagonal display, there are approximately 1200×900 nanotubes. Carbon nanotubes are known, with one way of making them described in U.S. Pat. No. 5,753,088, entitled "Method for Making Carbon Nanotubes" to Olk, which is incorporated by reference in its entirety. FIGS. 4A and 4B are enlarged front and top views, respectively, of a small portion of nanotube matrix 120 of FIG. 3. Nanotube matrix 120 is comprised of intersecting row electrodes 400 and column electrodes 410, which can be indium tin oxide (ITO) electrodes. Row electrodes 400 are perpendicular to column electrodes 410 and are coupled to column electrodes 410 at intersection points 415. A carbon nanotube 300 is deposited on row electrodes 400 at each intersection point 415. The designation of rows and columns is arbitrary, i.e., the nanotubes can also be deposited on columns, which overlie rows. Each row and column electrode has a terminal 420 coupled to selection and drive circuitry (not shown) to select desired one(s) of nanotubes 300. Consecutive stripes of phosphor 425 (red, green, and blue) are deposited over row electrodes 400 and nanotubes 300. Accordingly, a pattern of RGB phosphor is formed, in which individual elements (nanotubes), or equivalently, specific colors and locations, on the matrix can be selected.

Selected nanotubes 300 in matrix 120, acting as accelerating electrodes, help draw electron beams from electron guns 101–103 toward the corresponding overlying phosphor portions. The light (i.e., photons) emitted from the phosphor then travels through the front screen of enclosure 145 via the selected nanotube(s) 300 and row and column electrodes to produce the desired color image. Because a deflection yoke is no longer required, the glass envelope or vacuum and energy consumption are reduced. Thus, the electron guns and addressable nanotube matrix together direct electron beams to desired portions of the phosphor coated display screen to produce an image with a smaller, lighter, and lower energy consumption device.

Figure 5:
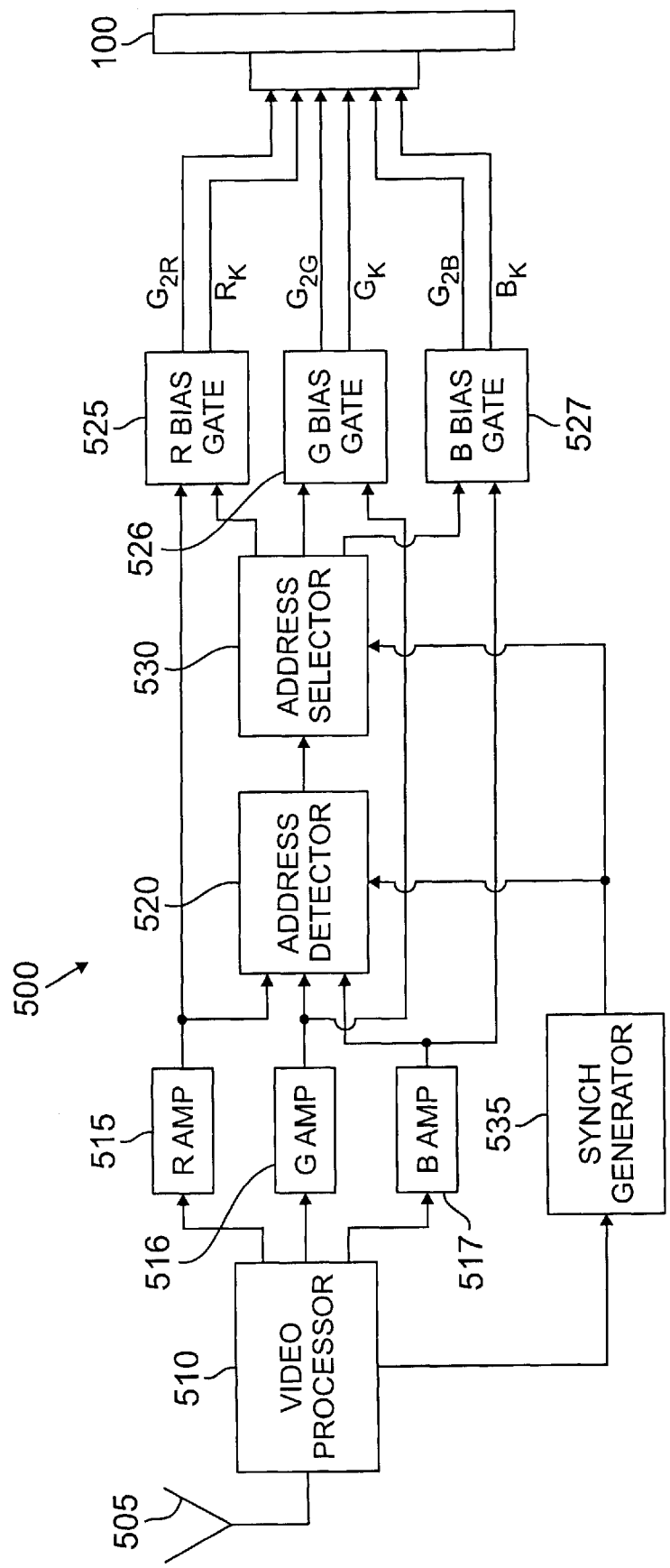
FIG. 5 is a block diagram of a system for use with the CRT display of FIG. 1 according to one embodiment of the present invention.

FIG. 5 is one embodiment of a system 500 for selecting desired nanotubes in addressable nanotube matrix 120. System 500 includes a video receiving element 505, such as a satellite dish, ground-based antennae or cable, for receiving an incoming video signal. A video processor 510 separates the video signal into primary color components red, green, and blue, and routes each color component to a corresponding red (R) amplifier 515, green (G) amplifier 516, and blue (B) amplifier 517. After amplification, the individual RGB signals are sent from amplifiers 515–517 to an address detector 520 and a corresponding red bias gate 525, green bias gate 526, and blue bias gate 527.

Based on the magnitude of the RGB input signals, address detector 520 assigns a proportional voltage to each nanotube 300 of nanotube matrix 120 and sends the information to an address selector 530. Address selector 530 then transmits signals to trigger RGB bias gates 525–527 and also sends pixel state (on/off) information to the row and column matrix of the CRT display. Based on the signals from address selector 530, red bias gate 525 transmits bias voltage $G_{2R}$ and voltage $R_k$, green bias gate 526 transmits bias voltage $G_{2G}$ and voltage $G_k$, and blue bias gate 527 transmits bias voltage $G_{2B}$ and voltage $B_k$ to CRT display 100. Biasing voltages $G_{2R}$, $G_{2G}$, and $G_{2B}$ are transmitted to the grids of the respective electron guns, and cathode voltages $R_k$, $G_k$, and $B_k$ are transmitted to the cathodes of the respective electron guns. In conjunction, pixel state information sent to the row and column matrix of the CRT display causes selected nanotubes to turn on, resulting in desired phosphor portions emitting photons. Address detector 520 and address selector 530 are synchronized by a synchronization generator 535 through a clock signal by a crystal oscillator in synchronization generator 535. Note that aspect ratio can also be adjusted. The aspect ratio can be adjusted by changing the number of rows and columns of the addressable nontubes.

Although the invention has been described with reference to particular embodiments, the description is only an example of the invention's application and should not be taken as a limitation. Consequently, various adaptations and combinations of features of the embodiments disclosed are within the scope of the invention as defined by the following claims.

I claim:

1. A cathode ray tube (CRT) display system, comprising:
    an addressable nanotube matrix having a first face and a second face;
    a plurality of electron guns directed toward the first face of the addressable nanotube matrix;
    an addressing circuit coupled to the nanotube matrix and the plurality of electron guns; and
    an enclosure containing the addressable nanotube matrix and at least a portion of the plurality of electron guns, wherein the addressable nanotube matrix comprises phosphor formed over nanotubes of the nanotube matrix, wherein the phosphor is located between the plurality of electron guns and the nanotubes.

2. The system of claim 1, wherein the addressable nanotube matrix comprises:
    a plurality of row electrodes, wherein each row electrode is coupled to a row of nanotubes;
    a plurality of column electrodes approximately perpendicular to the plurality of row electrodes; and
    terminals coupled to each of the pluralities of row electrodes and column electrodes.

3. The system of claim 2, wherein the phosphor is formed stripes over the nanotubes, and wherein the sequence of stripes is red, green, and blue phosphor.

4. The system of claim 2, wherein the plurality of column and row electrodes are formed from indium tin oxide.

5. The system of claim 1, wherein the plurality of electron guns comprises a red, a green, and a blue electron gun.

6. The system of claim 1, wherein the enclosure is vacuum sealed and approximately rectangular.

7. A method of displaying an image in a cathode ray tube (CRT) system, comprising:

scanning a first face of a phosphor pattern with electron beams;

turning on carbon nanotubes located on a second face of the phosphor pattern, corresponding to the scanning of the phosphor pattern;

wherein the addressable nanotube matrix comprises phosphor formed over nanotubes of the nanotube matrix, wherein the phosphor is located between the plurality of electron guns and the nanotubes; and displaying an image resulting from the electron beams impinging on the first face of the phosphor pattern.

8. The method of claim 7, wherein the phosphor pattern is placed on a matrix of the carbon nanotubes.

9. The method of claim 8, wherein the matrix is formed from intersecting columns and rows of electrodes.

10. The method of claim 8, wherein the phosphor pattern is formed with alternating red, green, and blue phosphor stripes.

11. The method of claim 7, further comprising vacuum sealing the carbon nanotubes.

12. The method of claim 7, wherein the scanning is done with rear projection electron guns.

13. The method of claim 12, wherein the rear projection electron guns are red, green, and blue electron guns.

* * * * *

UNITED STATES PATENT AND TRADEMARK OFFICE
CERTIFICATE OF CORRECTION

PATENT NO. : 6,515,639 B1
DATED : February 4, 2003
INVENTOR(S) : Luis Martinez

It is certified that error appears in the above-identified patent and that said Letters Patent is hereby corrected as shown below:

Column 4,
Line 2, change "antennae" to -- antenna --.
Line 34, change "nontubes" to -- nanotubes --.

Signed and Sealed this

Twenty-fourth Day of June, 2003

JAMES E. ROGAN
*Director of the United States Patent and Trademark Office*